US012561905B2

(12) United States Patent
Li et al.

(10) Patent No.: US 12,561,905 B2
(45) Date of Patent: Feb. 24, 2026

(54) OPTIMIZING GENERATIVE MACHINE-LEARNED MODELS FOR SUBJECT-DRIVEN TEXT-TO-3D GENERATION

(71) Applicant: Google LLC, Mountain View, CA (US)

(72) Inventors: Yuanzhen Li, Newton Centre, MA (US); Amit Raj, Seattle, WA (US); Varun Jampani, Rockland, MA (US); Benjamin Joseph Mildenhall, San Francisco, CA (US); Benjamin Michael Poole, San Francisco, CA (US); Jonathan Tilton Barron, Alameda, CA (US); Kfir Aberman, San Mateo, CA (US); Michael Niemeyer, Cologne (DE); Michael Rubinstein, Natick, MA (US); Nataniel Ruiz Gutierrez, Boston, MA (US); Shiran Elyahu Zada, Tel Aviv (IL); Srinivas Kaza, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 157 days.

(21) Appl. No.: 18/611,236

(22) Filed: Mar. 20, 2024

(65) Prior Publication Data

US 2024/0320912 A1 Sep. 26, 2024

Related U.S. Application Data

(60) Provisional application No. 63/491,447, filed on Mar. 21, 2023.

(51) Int. Cl.
| | |
|---|---|
| *G06T 17/00* | (2006.01) |
| *H04N 13/279* | (2018.01) |
| *H04N 13/351* | (2018.01) |

(52) U.S. Cl.
CPC ........... *G06T 17/00* (2013.01); *H04N 13/279* (2018.05); *H04N 13/351* (2018.05)

(58) Field of Classification Search
CPC ......... G06T 17/00; G06T 15/08; G06T 15/20; H04N 13/279; H04N 13/351; G06F 40/30
See application file for complete search history.

(56) References Cited

U.S. PATENT DOCUMENTS

2019/0244379 A1\* 8/2019 Venkataraman ....... G06N 3/045
2020/0090002 A1\* 3/2020 Zhu ...................... G06F 18/253
(Continued)

FOREIGN PATENT DOCUMENTS

WO WO-2023233423 A1 * 12/2023 ........... H04N 13/117

OTHER PUBLICATIONS

Brooks et al., "InstructPix2Pix: Learning to Follow Image Editing Instructions", arXiv:2211.09800v1, Nov. 17, 2022, 15 pages.
(Continued)

*Primary Examiner* — Maurice L. Mcdowell, Jr.
(74) *Attorney, Agent, or Firm* — DORITY & MANNING, P.A.

(57) ABSTRACT

A fractional training process can be performed training images to an instance of a machine-learned generative image model to obtain a partially trained instance of the model. A fractional optimization process can be performed with the partially trained instance to an instance of a machine-learned three-dimensional (3D) implicit representation model obtain a partially optimized instance of the model. Based on the plurality of training images, pseudo multi-view subject images can be generated with the partially optimized instance of the 3D implicit representation model and a fully trained instance of the generative image model; The partially trained instance of the model can be trained with a set of training data. The partially optimized instance of the
(Continued)

machine-learned 3D implicit representation model can be trained with the machine-learned multi-view image model.

21 Claims, 6 Drawing Sheets

(56) References Cited

U.S. PATENT DOCUMENTS

2021/0117842 A1\*  4/2021  Smith ................... G06N 3/0455
2023/0377324 A1\*  11/2023  Kim ....................... G06V 10/82

OTHER PUBLICATIONS

Brooks et al., "InstructPix2Pix: Learning to Follow Image Editing Instructions", IEEE/ CVF Conference on Computer Vision and Pattern Recognition (CVPR), Jun. 18-22, 2023, Vancouver, Canada, 11 pages.
Chan et al., "Efficient Geometry-Aware 3D Generative Adversarial Networks", IEEE Conference on Computer Vision and Pattern Recognition (CVPR), Jun. 19-24, 2022, New Orleans, Louisiana, 11 pages.
Chan et al., "pi-GAN: Periodic Implicit Generative Adversarial Networks for 3D-Aware Image Synthesis", IEEE Conference on Computer Vision and Pattern Recognition (CVPR), Jun. 19-25, 2021, 11 pages.
Chang et al., "MaskGIT: Masked Generative Image Transformer", IEEE/CVF Conference on Computer Vision and Pattern Recognition, Jun. 19-24, 2022, New Orleans, Louisiana, 11 pages.
Chang et al., "Muse: Text-To-Image Generation via Masked Generative Transformers", arXiv:2301.00704v1, Jan. 2, 2023, 22 pages.
Choy et al., "3D-R2N2: A Unified Approach for Single and Multi-view 3D Object Reconstruction", arXiv:1604.00449v1, Apr. 2, 2016, 18 pages.
Deng et al., "NeRDI: Single-View NeRF Synthesis with Language-Guided Diffusion as General Image Priors", arXiv:2212.03267v1, Dec. 6, 2022, 12 pages.
Dhariwal et al., "Diffusion Models Beat GANs on Image Synthesis", 35th Conference on Neural Information Processing Systems (NeurIPS) 2021, 15 pages.
Fan et al., "A Point Set Generation Network for 3D Object Reconstruction from a Single Image", IEEE Conference on Computer Vision and Pattern Recognition (CVPR), 2017, 9 pages.
Gafni et al., "Make-A-Scene: Scene-Based Text-to-Image Generation with Human Priors", arXiv:2203.13131v1, Mar. 24, 2022, 17 pages.
Gal et al, "An Image is Worth One Word: Personalizing Text-to-Image Generation Using Textual Inversion", .arXiv2208.01618v1, Aug. 2, 2022, 26 pages.
Gkioxari et al., "Mesh R-CNN", arXiv:1906.02739v1, Jun. 6, 2019, 15 pages.
Goodfellow et al., "Generative Adversarial Networks", Communications of the ACM, vol. 63, No. 11, Nov. 2020, pp. 139-144.
Ho et al., "Denoising Diffusion Probabilistic Models", 34th Conference on Neural Information Processing Systems (NeurIPS), 2020, Vancouver, Canada, 12 pages.
Huang et al., "Composer: Creative and Controllable Image Synthesis with Composable Conditions", arXiv:2302.09778v2, Feb. 22, 2023, 16 pages.
Jain et al., "Zero-Shot Text-Guided Object Generation with Dream Fields", arXiv:2112.01455v2, May 4, 2022, 14 pages.
Kawar et al., "Imagic: Text-based Real Image Editing with Diffusion Models", arXiv:2210.09276v2, Nov. 22, 2022, 16 pages.
Kumari et al., "Multi-Concept Customization of Text-to-Image Diffusion", arXiv:2212.04488v1, Dec. 8, 2022, 22 pages.
Kyriazi et al., "RealFusion: 360° Reconstruction of Any Object from a Single Image", arXiv:2302.10663v2, Feb. 23, 2023, 20 pages.

Li et al., "Gligen: Open-Set Grounded Text-to-Image Generation", arXiv:2301.07093v1, Jan. 17, 2023, 18 pages.
Lin et al., "Magic3D: High-Resolution Text-to-3D Content Creation", arXiv:2211.10440v1 , Nov. 18, 2022, 19 pages.
Meng et al., "SDEdit: Guided Image Synthesis and Editing with Stochastic Differential Equations", arXiv:2108.01073v2, Jan. 5, 2022, 33 pages.
Mescheder et al., "Occupancy Networks: Learning 3D Reconstruction in Function Space", IEEE Conference on Computer Vision and Pattern Recognition (CVPR), 2019, 11 pages.
Metzer et al., "Latent-NeRF for Shape-Guided Generation of 3D Shapes and Textures", arXiv:2211.07600v1, Nov. 14, 2022, 11 pages.
Mildenhall et al., "NeRF: Representing Scenes as Neural Radiance Fields for View Synthesis", 2020 European Conference on Computer Vision (ECCV), Jan. 2020, vol. 65, No. 1, 8 pages.
Mokady et al., "Null-Text Inversion for Editing Real Images Using Guided Diffusion Models", arXiv:2211.09794v1, Nov. 17, 2022, 20 pages.
Nichol et al., "GLIDE: Towards Photorealistic Image Generation and Editing with Text-Guided Diffusion Models", arXiv:2112.10741v3, Mar. 8, 2022, 20 pages.
Niemeyer et al., "GIRAFFE: Representing Scenes as Compositional Generative Neural Feature Fields", arXiv:2011.12100v2, Apr. 29, 2021, 12 pages.
Radford et al., "Learning Transferable Visual Models from Natural Language Supervision", arXiv:2103.00020v1, Feb. 26, 2021, 48 pages.
Raffel et al., "Exploring the Limits of Transfer Learning with a Unified Text-to-Text Transformer", arXiv:1910.10683v4, Sep. 19, 2023, 67 pages.
Ramesh et al., "Hierarchical Text-Conditional Image Generation with CLIP Latents", arXiv:2204.06125v1, Apr. 13, 2022, 27 pages.
Rombach et al., "High-Resolution Image Synthesis with Latent Diffusion Models", IEEE Conference on Computer Vision and Pattern Recognition, (CVPR), 2022, 12 pages.
Saharia et al., "Photorealistic Text-to-Image Diffusion Models with Deep Language Understanding", 36th Conference on Neural Information Processing (NeurIPS), 2022, 16 pages.
Sauer et al., "StyleGAN-T: Unlocking the Power of GANs for Fast Large-Scale Text-to-Image Synthesis", arXiv:2301.09515v1, Jan. 23, 2023, 13 pages.
Schwarz et al., "On the Frequency Bias of Generative Models", 35th Conference on Neural Information Processing Systems (NeurIPS), 2021, 11 pages.
Voynov et al., "Sketch-Guided Text-To-Image Diffusion Models", arXiv:2211.13752v1, Nov. 24, 2022, 15 pages.
Wen et al., "Pixel2mesh++: Multi-View 3D Mesh Generation via Deformation", arXiv:1908.01491v2, Aug. 16, 2019, 17 pages.
Xu et al., "NeuralLift-360: Lifting an In-The-Wild 2D Photo to a 3D Object with 360° Views", arXiv:2211.16431v1, Nov. 29, 2022, 11 pages.
Yu et al., "Scaling Autoregressive Models for Content-Rich Text-To-Image Generation", arXiv:2206.10789v1, Jun. 22, 2022, 10 pages.
Zhang et al., "Adding Conditional Control to Text-to-Image Diffusion Models", arXiv:2302.05543v3, Nov. 26, 2023, 12 pages.
International Search Report and Written Opinion for PCT/US2024/020895, mailed on Jul. 9, 2024, 16 pages.
Liu et al., "Make-Your-3D: Fast and Consistent Subject-Driven 3D Content Generation", arXiv:2403.09625v1, Mar. 14, 2024, 26 pages.
Poole et al., "DreamFusion: Text-to-3D using 2D Diffusion", arXiv:2209.14988v1, Sep. 29, 2022, 18 pages.
Raj et al., "DreamBooth3D: Subject-Driven Text-to-3D Generation", arXiv:2303.13508v2, Mar. 27, 2023, 13 pages.
Ruiz et al., "DreamBooth: Fine Tuning Text-to-Image Diffusion Models for Subject-Driven Generation", arXiv:2208.12242v2, Mar. 15, 2023, 25 pages.
International Preliminary Report on Patentability for Application No. PCT/US2024/020895, mailed Oct. 2, 2025, 11 pages.

\* cited by examiner

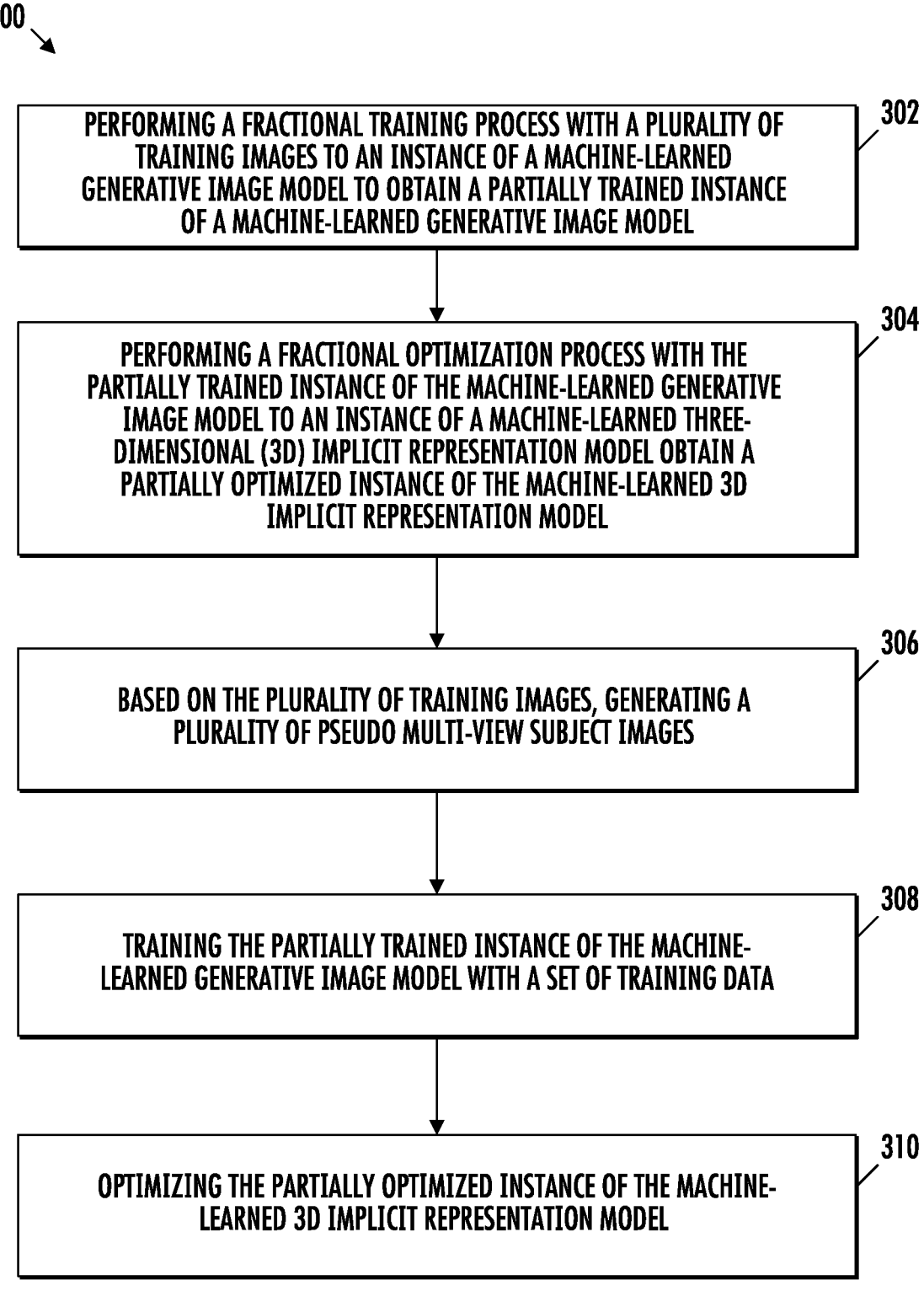

300

302
PERFORMING A FRACTIONAL TRAINING PROCESS WITH A PLURALITY OF TRAINING IMAGES TO AN INSTANCE OF A MACHINE-LEARNED GENERATIVE IMAGE MODEL TO OBTAIN A PARTIALLY TRAINED INSTANCE OF A MACHINE-LEARNED GENERATIVE IMAGE MODEL

304
PERFORMING A FRACTIONAL OPTIMIZATION PROCESS WITH THE PARTIALLY TRAINED INSTANCE OF THE MACHINE-LEARNED GENERATIVE IMAGE MODEL TO AN INSTANCE OF A MACHINE-LEARNED THREE-DIMENSIONAL (3D) IMPLICIT REPRESENTATION MODEL OBTAIN A PARTIALLY OPTIMIZED INSTANCE OF THE MACHINE-LEARNED 3D IMPLICIT REPRESENTATION MODEL

306
BASED ON THE PLURALITY OF TRAINING IMAGES, GENERATING A PLURALITY OF PSEUDO MULTI-VIEW SUBJECT IMAGES

308
TRAINING THE PARTIALLY TRAINED INSTANCE OF THE MACHINE-LEARNED GENERATIVE IMAGE MODEL WITH A SET OF TRAINING DATA

310
OPTIMIZING THE PARTIALLY OPTIMIZED INSTANCE OF THE MACHINE-LEARNED 3D IMPLICIT REPRESENTATION MODEL

FIG. 3

OPTIMIZING GENERATIVE MACHINE-LEARNED MODELS FOR SUBJECT-DRIVEN TEXT-TO-3D GENERATION

PRIORITY CLAIM

The present application is based on and claims priority to U.S. Provisional Application No. 63/491,447 having a filing date of Mar. 21, 2023, which is incorporated by reference herein.

FIELD

The present disclosure relates generally to optimization of machine-learned models. More particularly, the present disclosure relates to optimizing generative models for subject-driven text-to-3D data generation present application is based on and claims priority to U.S. Provisional Application No. 63/418,309 having a filing date of Oct. 21, 2022, which is incorporated by reference herein.

BACKGROUND

Generative machine-learned models, and generative Text-to-Image (T2I) models in particular, have greatly enhanced asset generation processes in recent years. For example, conventional T2I models can generate images based on a semantic understanding of a textual prompt, which facilitates fast and efficient asset creation and prototyping for artists and other creatives. More recently, the generation of three-dimensional representations from textual prompts, or from two dimensional images, have been explored. However, such models have suffered from overfitting of viewpoint. In other words, such generative models exhibit relatively poor performance when generating viewpoints of subjects that are not present in any images provided as input to the models.

SUMMARY

Aspects and advantages of embodiments of the present disclosure will be set forth in part in the following description, or can be learned from the description, or can be learned through practice of the embodiments.

One example aspect of the present disclosure is directed to computing system. The computing system includes one or more processors and one or more non-transitory computer-readable media that store instructions that, when executed by the one or more processors, cause the one or more processors to perform operations. The operations include performing a fractional training process with a plurality of training images to an instance of a machine-learned generative image model to obtain a partially trained instance of the machine-learned generative image model, wherein the machine-learned generative image model is partially trained to generate images from a textual prompt. The operations include performing a fractional optimization process with the partially trained instance of the machine-learned generative image model to an instance of a machine-learned three-dimensional (3D) implicit representation model obtain a partially optimized instance of the machine-learned 3D implicit representation model, wherein the machine-learned 3D implicit representation model is trained to generate novel representations of a scene depicted by a set of images. The operations include, based on the plurality of training images, generating a plurality of pseudo multi-view subject images with the partially optimized instance of the machine-learned 3D implicit representation model and a fully trained instance of the machine-learned generative image model. The operations include training the partially trained instance of the machine-learned generative image model with a set of training data comprising the plurality of training images and the plurality of pseudo multi-view subject images to obtain a machine-learned multi-view image model. The operations include optimizing the partially optimized instance of the machine-learned 3D implicit representation model with the machine-learned multi-view image model to obtain a further optimized instance of the machine-learned 3D implicit representation model.

Another example aspect of the present disclosure is directed to a computer-implemented method. The method includes performing, by a computing system comprising one or more computing devices, a fractional training process with a plurality of training images to an instance of a machine-learned generative image model to obtain a partially trained instance of the machine-learned generative image model, wherein the machine-learned generative image model is partially trained to generate images from a textual prompt. The method includes, based on the plurality of training images, generating, by the computing system, a plurality of pseudo multi-view subject images with a partially optimized instance of a machine-learned 3D implicit representation model and a fully trained instance of the machine-learned generative image model, wherein the machine-learned 3D implicit representation model is trained to generate novel representations of a scene depicted by a set of images. The method includes training, by the computing system, the partially trained instance of the machine-learned generative image model with a set of training data comprising the plurality of training images and the plurality of pseudo multi-view subject images to obtain a machine-learned multi-view image model. The method includes optimizing, by the computing system, the partially optimized instance of the machine-learned 3D implicit representation model with the machine-learned multi-view image model to obtain a further optimized instance of the machine-learned 3D implicit representation model.

Another example aspect of the present disclosure is directed to one or more non-transitory computer-readable media that store instructions that, when executed by one or more processors, cause the one or more processors to perform operations. The operations include performing a fractional optimization process with a partially trained instance of a machine-learned generative image model to an instance of a machine-learned 3D implicit representation model to obtain a partially optimized instance of the machine-learned 3D implicit representation model, wherein the machine-learned 3D implicit representation model is trained to generate novel representations of a scene depicted by a set of images, wherein the machine-learned generative image model is partially trained to generate images from a textual prompt. The operations include, based on a plurality of training images, generating a plurality of pseudo multi-view subject images with the partially optimized instance of the machine-learned 3D implicit representation model and a fully trained instance of the machine-learned generative image model. The operations include training the partially trained instance of the machine-learned generative image model with a set of training data comprising the plurality of training images and the plurality of pseudo multi-view subject images to obtain a machine-learned multi-view image model. The operations include optimizing the partially optimized instance of the machine-learned 3D implicit representation model with the machine-learned multi-view image model to obtain a further optimized instance of the machine-learned 3D implicit representation model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3 depicts a flow chart diagram of an example method to perform optimization of a machine-learned generative image model according to example embodiments of the present disclosure.

Figure 1A:
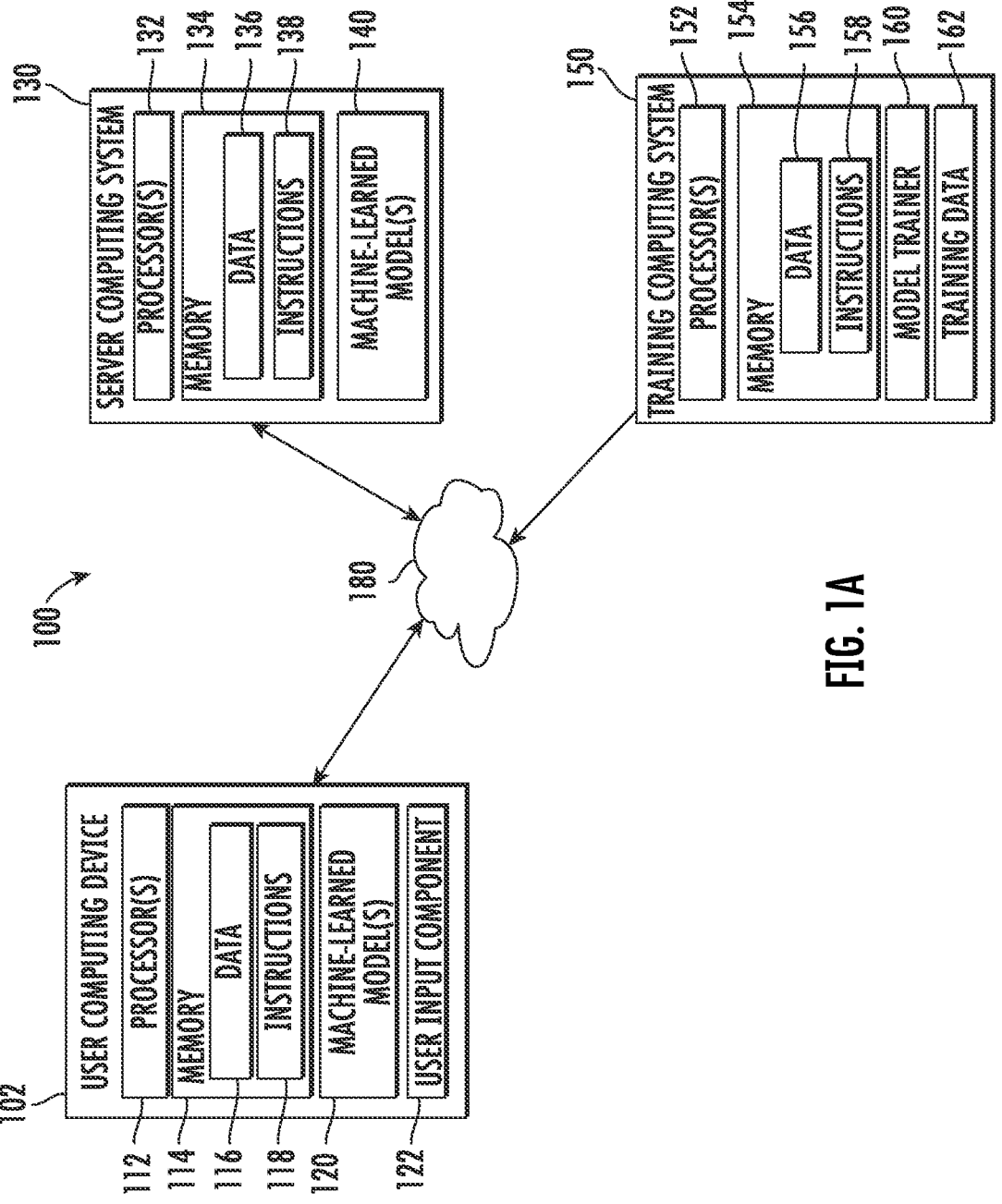
FIG. 1A depicts a block diagram of an example computing system that performs optimization of generative models for subject-driven text-to-3D data generation according to example embodiments of the present disclosure.

Reference numerals that are repeated across plural figures are intended to identify the same features in various implementations.

DETAILED DESCRIPTION

Overview

Generally, the present disclosure is directed to optimization of machine-learned models. More particularly, the present disclosure relates to optimizing generative models for subject-driven text-to-3D data generation. For example, as described previously, the generation of three-dimensional representations from textual prompts, and/or from two dimensional images, has recently been explored. However, such models have suffered from overfitting of viewpoint. In other words, such generative models exhibit relatively poor performance when generating viewpoints of subjects that are not present in any images provided as input to the models.

Accordingly, implementations of the present disclosure propose optimization of generative machine-learned models for more accurate, subject-driven text-to-3D asset generation. For example, a fractional training process can be performed with a plurality of training images to partially train an instance of a machine-learned generative image model. The machine-learned generative image model can be a model trained to generate images from a textual prompt. The machine-learned generative image model can be partially trained by stopping the training process before the model is fully optimized (e.g., a "fractional" training process). For example, if performing a number M training iterations would optimize the machine-learned generative image model to a sufficient degree, performing the fractional training process would include performing a number of training iterations N that is less than M.

A fractional optimization process can be performed with the partially trained instance of the machine-learned generative image model to an instance of a machine-learned 3D implicit representation model. By doing so, a partially optimized instance of the machine-learned 3D implicit representation model can be obtained. The machine-learned 3D implicit representation model can be a model trained to generate novel representations (e.g., implicit three-dimensional representations) of a three-dimensional scene depicted by a set of images. The fractional optimization process can be performed to the machine-learned 3D implicit representation model in a similar manner the fractional training process described previously.

Based on the plurality of training images, the partially optimized instance of the machine-learned 3D implicit representation model and a fully trained instance of the machine-learned generative image model can be used to generate a plurality of pseudo multi-view subject images. The partially trained instance of the machine-learned generative image model can be trained with a set of training data that includes the plurality of pseudo multi-view subject images and the plurality of training images to obtain a machine-learned multi-view image model. The machine-learned multi-view image model can be used to optimize the partially optimized instance of the machine-learned 3D implicit representation model to obtain a further optimized instance of the machine-learned 3D implicit representation model. In such fashion, implementations of the present disclosure can perform a series of operations to optimize a series of models for more accurate and efficient generation of 3D assets.

Aspects of the present disclosure provide a number of technical effects and benefits. As one example technical effect and benefit, conventional generative models for 3D assets are relatively inaccurate. Due to their inaccuracy, the practical applications of such models are relatively limited. However, implementations of the present disclosure can optimize generative models to generate 3D assets much more accurately. The outputs of these models, once optimized, are sufficiently accurate for utilization in a variety of use cases, such as 3D asset generation for multimedia applications (e.g., video games, etc.), rapid prototyping, etc. As such, in some circumstances, implementations of the present disclosure can eliminate, or substantially reduce, the need to create 3D assets by hand, which requires a substantial expenditure of resources (e.g., time, power, memory, compute cycles, bandwidth, etc.).

With reference now to the Figures, example embodiments of the present disclosure will be discussed in further detail.

Example Devices and Systems

FIG. 1A depicts a block diagram of an example computing system 100 that performs optimization of generative models for subject-driven text-to-3D data generation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned model(s) 120. For example, the machine-learned model(s) 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example models 120 are discussed with reference to FIGS. 2-3.

In some implementations, the one or more machine-learned model(s) 120 can be received from the server computing system 130 over network 180, stored in the user computing device memory 114, and then used or otherwise implemented by the one or more processors 112. In some implementations, the user computing device 102 can implement multiple parallel instances of a single model 120 (e.g., to perform parallel 3D asset generation across multiple instances of the model).

More particularly, the machine-learned model(s) 120 can include one or more instances of a machine-learned generative image model. The machine-learned generative image model can be a model that is trained to generate images given a text prompt. For example, the machine-learned generative image model can be a diffusion model $\mathcal{D}_\theta(\varepsilon, c)$ that takes as input an initial noise $\varepsilon \sim \mathcal{N}(0,1)$ and a text embedding $c=\Theta(P)$ for a given prompt P with a text encoder $\Theta$ that generates an image that follows the description of the prompt. Further, in some implementations, the machine-learned generative image model can be a model that can be personalized by fine-tuning the network on a set of casual captures $\{I_i\}$. For example, the machine-learned generative image model can, in some implementations, be personalized using a standard diffusion loss function:

6

$$\mathcal{L} = \mathbb{E}_{\varepsilon,t}\left[w_t\|\mathcal{D}_\theta(\alpha_t I_i + \sigma_t\varepsilon, \ c) - I_i\|^2\right]$$

where $t\sim\mathcal{U}[(0,1)]$ denotes the time-step in the diffusion process and $w_t$, $\alpha_t$, $\sigma_t$ are the corresponding scheduling parameters.

The machine-learned model(s) 120 can further include a machine-learned 3D implicit representation model. The machine-learned 3D implicit representation model can be a model that is trained to generate implicit representations of a scene depicted by a set of images. For example, in some implementations, the machine-learned 3D implicit representation model may be a network, such as a Multi-layer Perception (MLP), that implements a Neural Radiance Field (NeRF) $\mathcal{M}_\varnothing$. The model $\mathcal{M}_\varnothing$ can be an implicit network that takes a 3D location (e.g., in integrated encoding) as input and outputs the albedo color and differential opacity at that point. In some implementations, the models 120 can include a shading model (e.g., a Phong shading model, etc.) to render an image $\hat{I}_v$=phong(color, lighting, normals).

The model $\mathcal{M}_\varnothing$ can be optimized using the machine-learned generative image model with $\varnothing$ parameters based on the text prompt P. For example, the model $\mathcal{M}_\varnothing$ may be trained using a score distillation (SDS) loss function based on a rendering output $\hat{I}_v$ along with input text embeddings c as:

$$\nabla_\varnothing\mathcal{L}_{SDS} = \mathbb{E}_{\varepsilon,t}\left[w_t\|\mathcal{D}_\theta(\alpha_t\hat{I}_v + \sigma_t\varepsilon, \ c) - \hat{I}_v\|\frac{\partial\hat{I}_v}{\partial\phi}\right]$$

Additionally or alternatively, one or more models 140 can be included in or otherwise stored and implemented by the server computing system 130 that communicates with the user computing device 102 according to a client-server relationship. For example, the models 140 can be implemented by the server computing system 130 as a portion of a web service (e.g., a 3D asset generation service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more models 140. For example, the models 140 can be or can otherwise include various machine-learned models. Example machine-learned models include neural networks or other multi-layer nonlinear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the OVERALL models 120 and/or 140 based on a set of training data 162. The training data 162 can include, for example, image data depicting a scene from a variety of different viewpoints.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
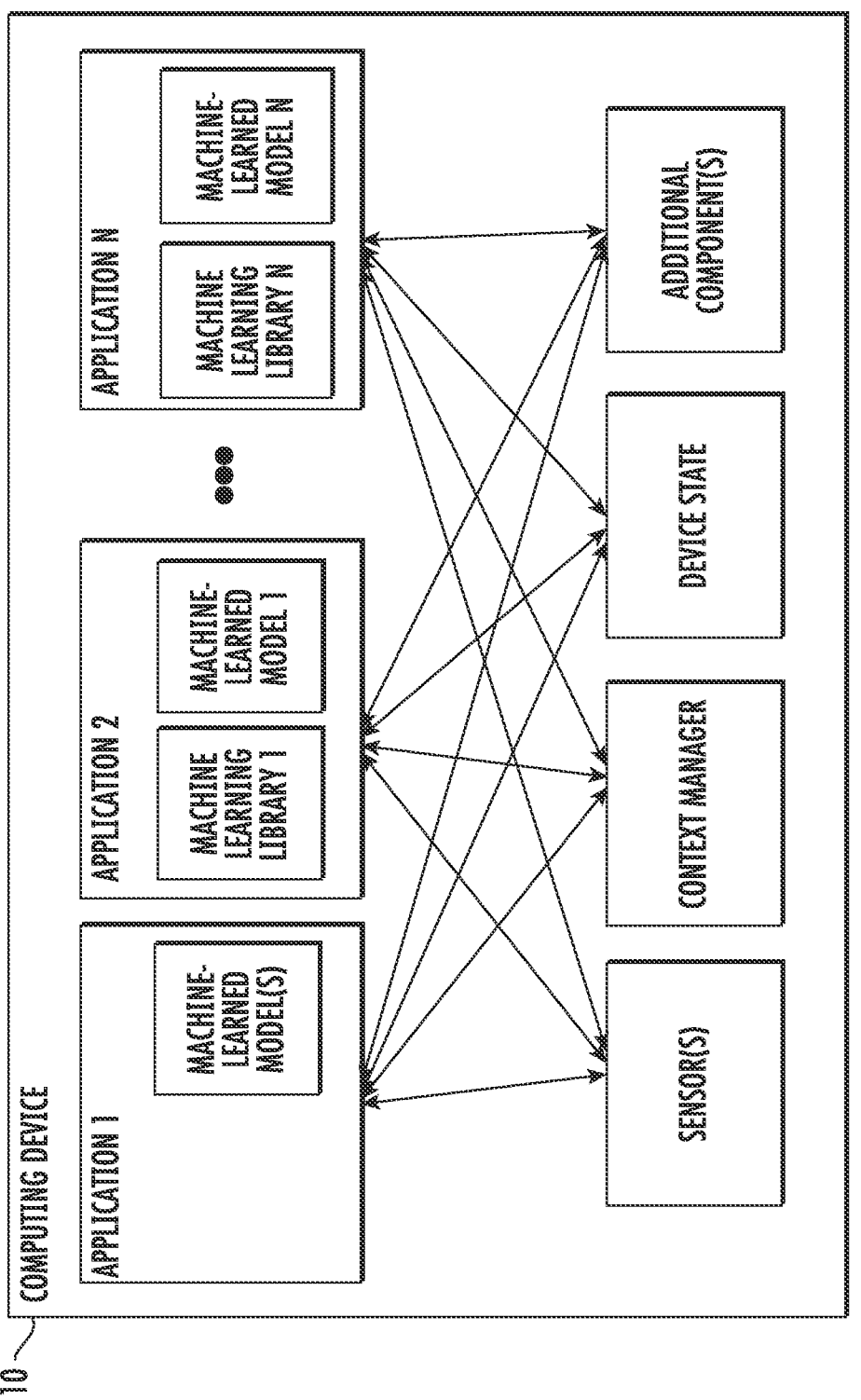
FIG. 1B depicts a block diagram of an example computing device that performs machine-learned generation of 3D assets according to example embodiments of the present disclosure.

FIG. 1B depicts a block diagram of an example computing device 10 that performs machine-learned generation of 3D assets according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
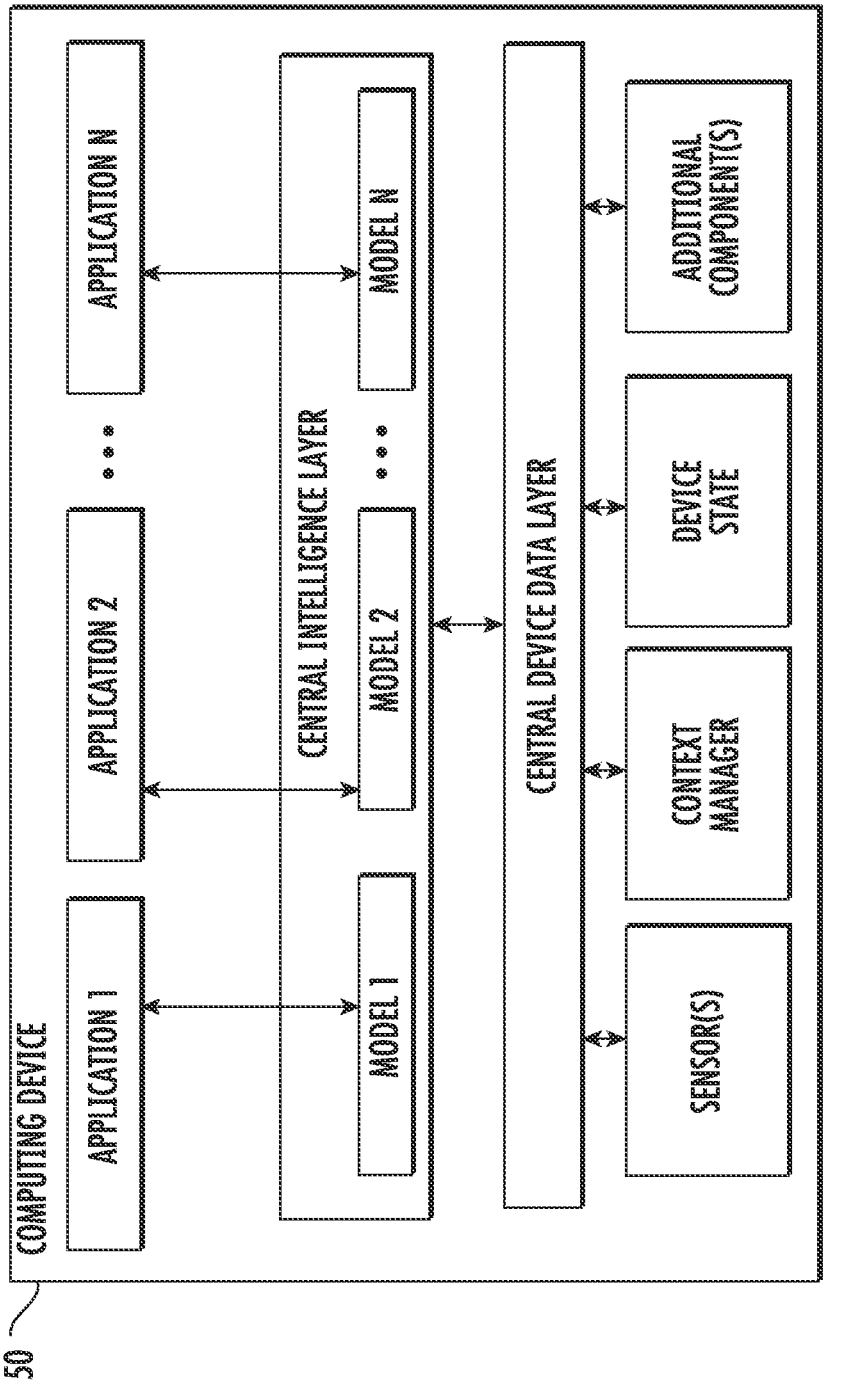
FIG. 1C depicts a block diagram of an example computing device that performs machine-learned generation of 3D assets according to example embodiments of the present disclosure.

FIG. 1C depicts a block diagram of an example computing device 50 that performs machine-learned generation of 3D assets according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2A:
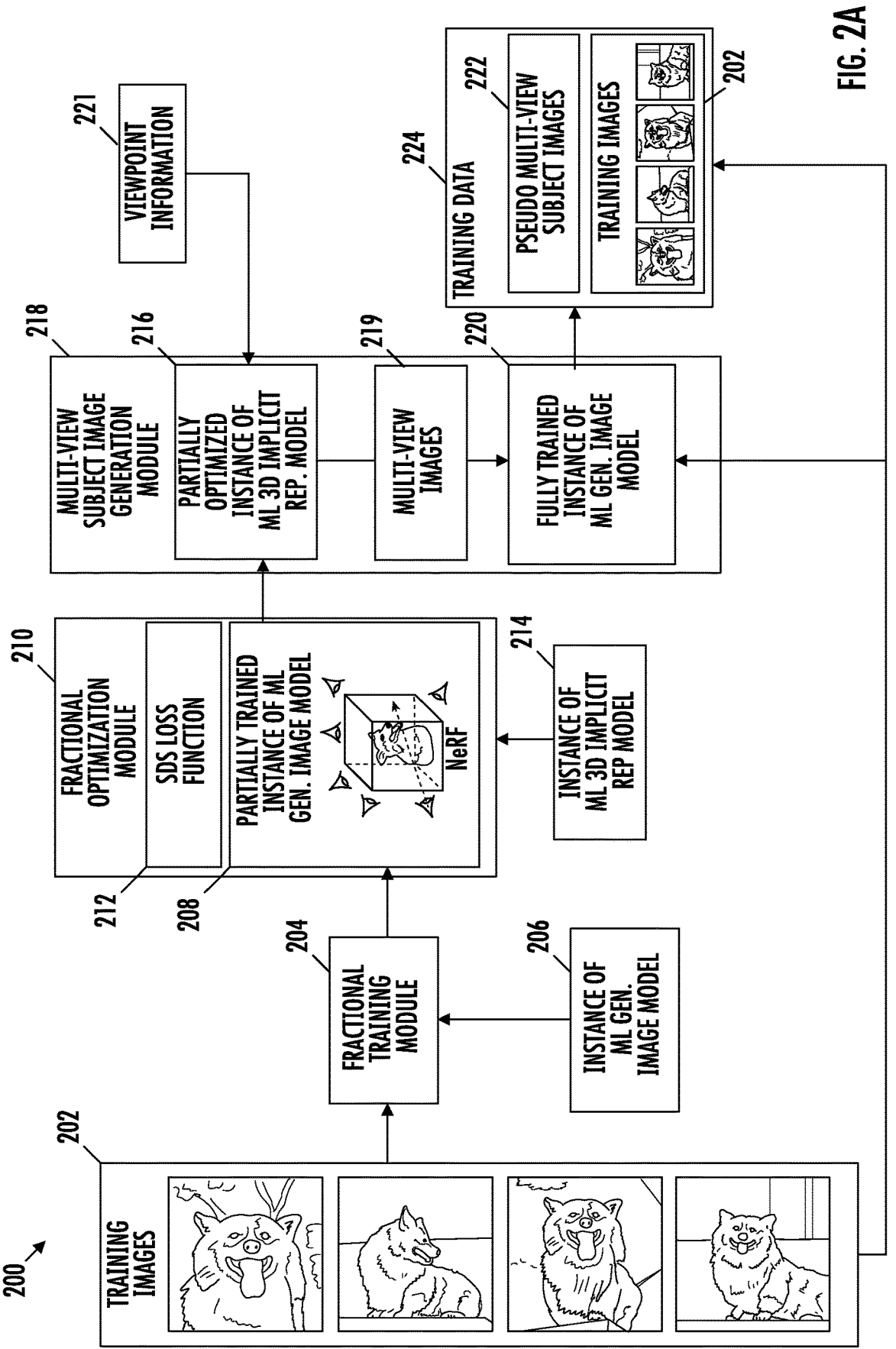
FIG. 2A depicts a data flow diagram for optimizing generative machine-learned models for subject-driven text-to-3D image generation according to some implementations of the present disclosure.

FIG. 2A depicts a data flow diagram 200 for optimizing generative machine-learned models for subject-driven text-to-3D image generation according to some implementations of the present disclosure. More particularly, a computing system, such as the server computing system 130 of FIG. 1A, can obtain training images 202. The training images 202 can include a plurality of images that depict a subject (e.g., object(s), a scene, both object(s) and a scene, etc.) from different viewpoints. To follow the depicted example, the training images 202 can depict a dog from multiple viewpoints (e.g., a front facing viewpoint, a side facing viewpoint, a rotated front-facing viewpoint, etc.). The computing system can utilize a fractional training module 204 to partially train an instance 206 of a machine-learned generative image model to obtain a partially trained instance 208 of the machine-learned generative image model.

More specifically, the fractional training module 204 can be configured to train an instance of a machine-learned model across a number of training iterations that is less than the number of training iterations required for a certain degree of model accuracy. For example, a model may be considered sufficiently accurate when the accuracy of the model is above a threshold degree of accuracy (e.g., 70% accuracy). The fractional training module 204 can perform a number of training iterations such that the accuracy of the model is less than the threshold degree of accuracy. As another example, the fractional training module 204 can perform a pre-determined number of training iterations that is known to be less than the number of training iterations required to fully optimize a machine-learned model. As such, it should be broadly understood that the fractional training module 204 will perform fewer training iterations than a conventional training module that is configured to fully train a machine-learned model (e.g., train until a local minima is discovered through gradient descent, etc.).

The fractional training module 204 can partially train the instance 206 of the machine-learned generative image model using the training images 202 to obtain the partially trained instance 208 of the machine-learned generative image model. The computing system can include a fractional optimization module 210 that can utilize the partially trained instance 208 of the machine-learned generative image model and an SDS loss function 212 to partially optimize an instance 214 of a machine-learned 3D implicit representation model to obtain a partially optimized instance 216 of the machine-learned 3D implicit representation model. The instance 214 of a machine-learned 3D implicit representation model can be partially optimized in a manner similar to that of the fractional training module 204.

As a particular example, assume that the machine-learned generative image model is a text-to-image diffusion model, and instance 206 is an instance $\mathcal{D}_\theta$ of the text-to-image diffusion model. The instance $\mathcal{D}_\theta$ 206 can be partially trained using the fractional training module to obtain instance $\hat{\mathcal{D}}_\theta^{partial}$ 208. The partially trained $\hat{\mathcal{D}}_\theta^{partial}$ instance 208 can be utilized by the fractional optimization module 210 to partially optimize the instance 214 of the machine-learned 3D implicit representation model according to a loss function $\mathcal{L} = \mathbb{E}_{\varepsilon,t}[w_t \|\mathcal{D}_\theta(\alpha_t I_i + \sigma_t \varepsilon, c) - I_i\|^2]$ to obtain the partially optimized instance 216 of the machine-learned 3D implicit representation model.

The computing system can include a multi-view subject image generation module 218. The multi-view subject image generation module 218 can include the partially optimized instance 216 of the machine-learned 3D implicit representation model, and a fully trained instance 220 of the machine-learned generative image model. For example, assume that the instance 206 of the machine-learned generative image model is one of two instances. The first instance (e.g., instance 206) can be partially trained using the fractional training module 204. The second instance (e.g., instance 220) can be fully trained using conventional ML training techniques. Using both the partially optimized instance 216 of the machine-learned 3D implicit representation model, and the fully trained instance 220 of the machine-learned generative image model, the multi-view subject image generation module 218 can generate a plurality of pseudo multi-view subject images 222 based on the training images 202. The computing system can obtain a set of training data 224 that includes the training images 202 and the pseudo multi-view subject images 222.

As a particular example, the multi-view subject image generation module can utilize the partially optimized instance 216 of the machine-learned 3D implicit representation model to generate multi-view images 219. Specifically, the partially optimized instance 216 of the machine-learned 3D implicit representation model can be used to render the multi-view images 219 $\{\hat{I}_v \in \mathbb{R}^{n \times 3}\}$ based on viewpoint information 221 that indicates a number of different viewpoints $\{v\}$. The multi-view images can be processed with the fully trained instance 220 of the machine-learned generative image model 220 to obtain the pseudo multi-view subject images. For example, a fixed amount of noise can be added by running a forward diffusion process from each render to $t_{pseudo}$, and then the reverse diffusion process can be run to generate samples using the fully-trained instance 220 of the machine-learned generative image model $\mathcal{D}_\theta$ to obtain pseudo multi-view subject images 222 $\{I_v^{pseudo}\}$ along with the training images 202 $\{I_i\}$ to obtain training data 224 $\{I_v^{pseudo}\} \cup \{I_i\}$.

Figure 2B:
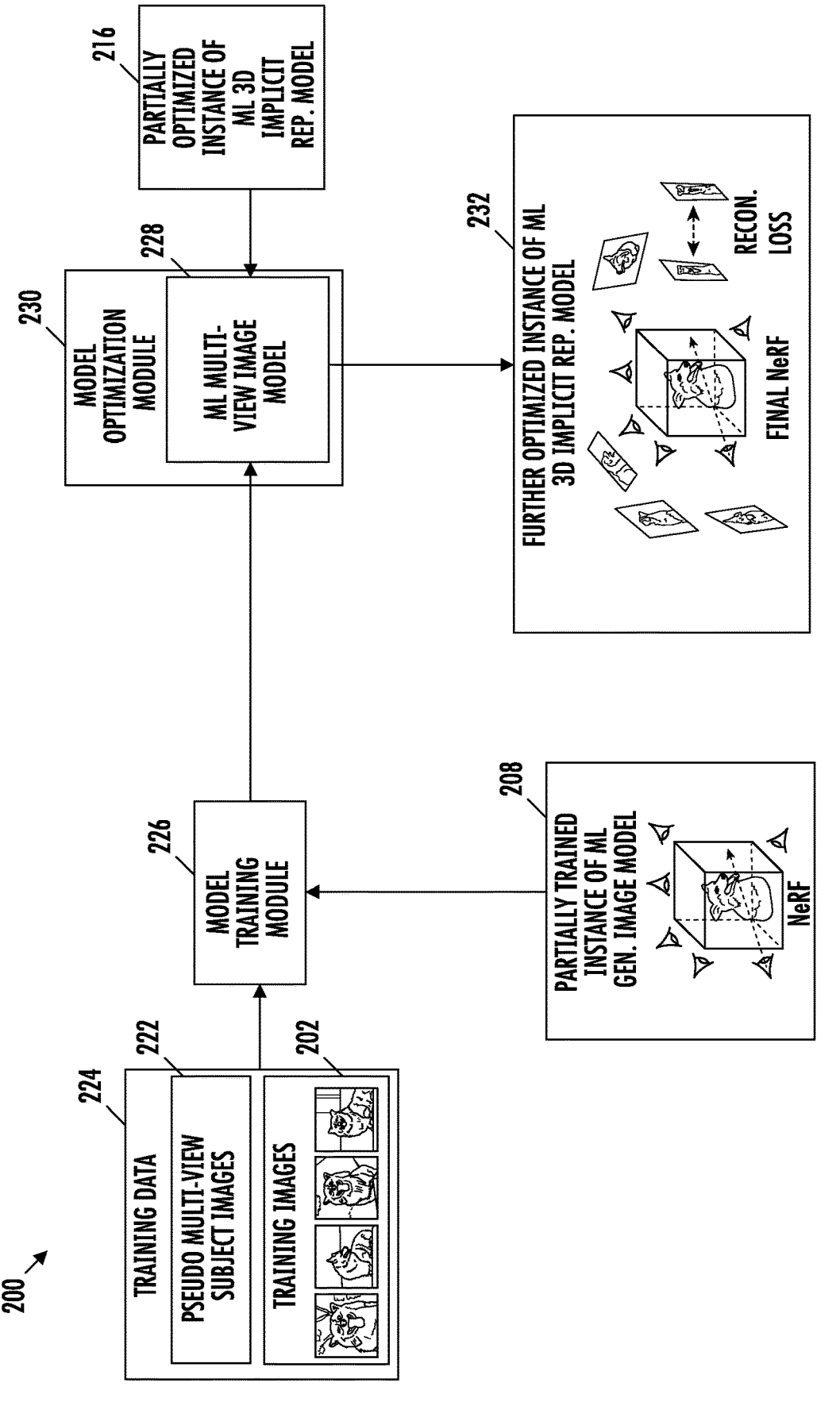
FIG. 2B further depicts the data flow diagram of FIG. 2A for optimizing generative machine-learned models for subject-driven text-to-3D image generation according to some implementations of the present disclosure.

FIG. 2B further depicts the data flow diagram 200 of FIG. 2A for optimizing generative machine-learned models for subject-driven text-to-3D image generation according to some implementations of the present disclosure. Specifically, the computing system (e.g., server computing system 130 of FIG. 1A) can include a model training module 226. The model training module 226 can train the partially trained instance 208 of the machine-learned generative image model using the training data 224 to obtain a machine-learned multi-view image model 228. The computing system can include a model optimization module 230 that includes the machine-learned multi-view image model 228. The model optimization module can optimize the partially optimized instance of the machine-learned 3D implicit representation model to obtain a further optimized instance 232 of the machine-learned 3D implicit representation model.

As a particular example, the partially trained instance 208 of the machine-learned generative image model $\hat{\mathcal{D}}_\theta^*$ can be trained by the model training module 226 with the training data 224 to obtain the machine-learned multi-view image model 228 $\hat{\mathcal{D}}_\theta^{multiview}$. The machine-learned multi-view image model 228 $\hat{\mathcal{D}}_\theta^{multiview}$ can be utilized by the model optimization module 230 to further optimize the partially optimized instance 216 of the machine-learned 3D implicit representation model using the previously described SDS loss function $\mathcal{L} = \mathbb{E}_{\varepsilon,t}[w_t \|\hat{\mathcal{D}}_\theta(\alpha_t I_i + \sigma_t \varepsilon, c) - I_i\|^2]$ to obtain a further optimized instance 232 $F_\gamma$ of the machine-learned 3D implicit representation model.

Additionally, in some implementations, the further optimized instance 232 $F_\gamma$ of the machine-learned 3D implicit representation model can be optimized using a novel weak reconstruction loss based on the pseudo multi-view images 222 $\{I_v^{pseudo}\}$. For example, since camera parameters $\{P_v\}$ from which the images $\{I_v^{pseudo}\}$ have been generated are known, the training of the further optimized instance 232 $F_\gamma$ of the machine-learned 3D implicit representation model can be regularized with reconstruction loss $\mathcal{L}_{RECON} = \|\Gamma(F_\gamma, P_v) - I_v^{pseudo}\|_p$, where $\Gamma(F_\gamma, P_v)$ is the rendering function that renders an image from the further optimized instance 232 $F_\gamma$ of the machine-learned 3D implicit representation model along the camera viewpoint $P_v$. This loss serves the dual purpose of pulling color distribution of the generated asset closer to those in image exemplars. Accordingly, the final optimization function for the further optimized instance 232 $F_\gamma$ of the machine-learned 3D implicit representation model

13 can be represented as $\mathcal{L} = \lambda_{RECON}\mathcal{L}_{RECON} + \lambda_{SDS}\mathcal{L}_{SDS} + \lambda_{NERF}\mathcal{L}_{NERF}$, where $\mathcal{L}_{NERF}$ denotes further neural radiance field regularizations.

Example Methods

FIG. 3 depicts a flow chart diagram of an example method 300 to perform optimization of a machine-learned generative image model according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can perform a fractional training process with a plurality of training images to an instance of a machine-learned generative image model to obtain a partially trained instance of a machine-learned generative image model. The machine-learned generative image model is partially trained to generate images from a textual prompt.

In some implementations, performing the fractional training process with a plurality of training images to the instance of the machine-learned generative image model can include performing N training iterations with the plurality of training images to the instance of the machine-learned generative image model, and the fully trained instance of the machine-learned generative image model can be trained using a training process with M training iterations where M>N. In some implementations, the machine-learned generative image model comprises a Neural Radiance Field (NeRF) model.

At 304, the computing system can perform a fractional optimization process with the partially trained instance of the machine-learned generative image model to an instance of a machine-learned 3D implicit representation model obtain a partially optimized instance of the machine-learned 3D implicit representation model. The machine-learned 3D implicit representation model is trained to generate novel representations of a scene depicted by a set of images.

In some implementations, performing the fractional optimization process with the partially trained instance of the machine-learned generative image model can include performing the fractional optimization process with the partially trained instance of the machine-learned generative image model and a score distillation (SDS) loss function. In some implementations, performing the fractional optimization process with the partially trained instance of the machine-learned generative image model and the score distillation (SDS) loss function can include, for one or more iterations, processing a textual prompt with the partially trained instance of the machine-learned generative image model to obtain a plurality of images corresponding to the textual prompt, processing the plurality of images and viewpoint information indicative of a viewpoint within a three-dimensional space with the partially optimized instance of the machine-learned 3D implicit representation model to obtain a rendering from the viewpoint within the three-dimensional space, evaluating the rendering with the SDS loss function, and modifying values of one or more parameters of the partially optimized instance of the machine-learned 3D implicit representation model.

At 306, the computing system, based on the plurality of training images, can generate a plurality of pseudo multi-view subject images with the partially optimized instance of the machine-learned 3D implicit representation model and a fully trained instance of the machine-learned generative image model.

In some implementations, generating the plurality of pseudo multi-view subject images can include rendering a plurality of multi-view images at a respective plurality of random viewpoints based on the plurality of training images, and processing the plurality of multi-view images with the fully trained instance of the machine-learned generative image model to obtain the plurality of pseudo multi-view subject images.

At 308, the computing system can train the partially trained instance of the machine-learned generative image model with a set of training data comprising the plurality of training images and the plurality of pseudo multi-view subject images to obtain a machine-learned multi-view image model.

At 310, the computing system can optimize the partially optimized instance of the machine-learned 3D implicit representation model with the machine-learned multi-view image model to obtain a further optimized instance of the machine-learned 3D implicit representation model.

In some implementations, optimizing the partially optimized instance of the machine-learned 3D implicit representation model can include processing a textual prompt with the machine-learned multi-view image model to obtain a plurality of multi-view images corresponding to the textual prompt, processing the plurality of multi-view images and second viewpoint information indicative of a second viewpoint with the partially optimized instance of the machine-learned 3D implicit representation model to obtain a second rendering from the second viewpoint within the three-dimensional space, evaluating the second rendering with the SDS loss function, and modifying values of one or more parameters of the partially optimized instance of the machine-learned 3D implicit representation model based on the SDS loss function to obtain the further optimized instance of the machine-learned 3D implicit representation model.

In some implementations, optimizing the partially optimized instance of the machine-learned 3D implicit representation model can further include evaluating a reconstruction loss function that evaluates a difference between the second rendering and the plurality of multi-view images, and modifying values of one or more parameters of the further optimized instance of the machine-learned 3D implicit representation model based on the reconstruction loss function. In some implementations, the machine-learned 3D implicit representation model can include one or more multi-layer perceptrons (MLPs).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
one or more processors; and
one or more non-transitory computer-readable media that store instructions that, when executed by the one or more processors, cause the one or more processors to perform operations, the operations comprising:
performing a fractional training process with a plurality of training images to an instance of a machine-learned generative image model to obtain a partially trained instance of the machine-learned generative image model, wherein the machine-learned generative image model is partially trained to generate images from a textual prompt;
performing a fractional optimization process with the partially trained instance of the machine-learned generative image model to an instance of a machine-learned three-dimensional (3D) implicit representation model obtain a partially optimized instance of the machine-learned 3D implicit representation model, wherein the machine-learned 3D implicit representation model is trained to generate novel representations of a scene depicted by a set of images;
based on the plurality of training images, generating a plurality of pseudo multi-view subject images with the partially optimized instance of the machine-learned 3D implicit representation model and a fully trained instance of the machine-learned generative image model;
training the partially trained instance of the machine-learned generative image model with a set of training data comprising the plurality of training images and the plurality of pseudo multi-view subject images to obtain a machine-learned multi-view image model; and
optimizing the partially optimized instance of the machine-learned 3D implicit representation model with the machine-learned multi-view image model to obtain a further optimized instance of the machine-learned 3D implicit representation model.

2. The computing system of claim 1, wherein performing the fractional training process with a plurality of training images to the instance of the machine-learned generative image model comprises performing N training iterations with the plurality of training images to the instance of the machine-learned generative image model; and
wherein the fully trained instance of the machine-learned generative image model is trained using a training process with M training iterations, and wherein M>N.

3. The computing system of claim 1, wherein the machine-learned generative image model comprises a Neural Radiance Field (NeRF) model.

4. The computing system of claim 1, wherein performing the fractional optimization process with the partially trained instance of the machine-learned generative image model comprises performing the fractional optimization process with the partially trained instance of the machine-learned generative image model and a score distillation (SDS) loss function.

5. The computing system of claim 4, wherein performing the fractional optimization process with the partially trained instance of the machine-learned generative image model and the score distillation (SDS) loss function comprises, for one or more iterations:
processing a textual prompt with the partially trained instance of the machine-learned generative image model to obtain a plurality of images corresponding to the textual prompt;
processing the plurality of images and viewpoint information indicative of a viewpoint within a three-dimensional space with the partially optimized instance of the machine-learned 3D implicit representation model to obtain a rendering from the viewpoint within the three-dimensional space;
evaluating the rendering with the SDS loss function; and
modifying values of one or more parameters of the partially optimized instance of the machine-learned 3D implicit representation model.

6. The computing system of claim 5, wherein optimizing the partially optimized instance of the machine-learned 3D implicit representation model comprises:
processing a textual prompt with the machine-learned multi-view image model to obtain a plurality of multi-view images corresponding to the textual prompt;
processing the plurality of multi-view images and second viewpoint information indicative of a second viewpoint with the partially optimized instance of the machine-learned 3D implicit representation model to obtain a second rendering from the second viewpoint within the three-dimensional space; and
evaluating the second rendering with the SDS loss function;
modifying values of one or more parameters of the partially optimized instance of the machine-learned 3D implicit representation model based on the SDS loss function to obtain the further optimized instance of the machine-learned 3D implicit representation model.

7. The computing system of claim 6, wherein optimizing the partially optimized instance of the machine-learned 3D implicit representation model further comprises:
evaluating a reconstruction loss function that evaluates a difference between the second rendering and the plurality of multi-view images; and
modifying values of one or more parameters of the further optimized instance of the machine-learned 3D implicit representation model based on the reconstruction loss function.

8. The computing system of claim 1, wherein generating the plurality of pseudo multi-view subject images comprises:
rendering a plurality of multi-view images at a respective plurality of random viewpoints based on the plurality of training images; and
processing the plurality of multi-view images with the fully trained instance of the machine-learned generative image model to obtain the plurality of pseudo multi-view subject images.

9. The computing system of claim 1, wherein the machine-learned 3D implicit representation model comprises one or more multi-layer perceptrons (MLPs).

10. A computer-implemented method, comprising:

performing, by a computing system comprising one or more computing devices, a fractional training process with a plurality of training images to an instance of a machine-learned generative image model to obtain a partially trained instance of the machine-learned generative image model, wherein the machine-learned generative image model is partially trained to generate images from a textual prompt;

based on the plurality of training images, generating, by the computing system, a plurality of pseudo multi-view subject images with a partially optimized instance of a machine-learned three-dimensional (3D) implicit representation model and a fully trained instance of the machine-learned generative image model, wherein the machine-learned 3D implicit representation model is trained to generate novel representations of a scene depicted by a set of images;

training, by the computing system, the partially trained instance of the machine-learned generative image model with a set of training data comprising the plurality of training images and the plurality of pseudo multi-view subject images to obtain a machine-learned multi-view image model; and optimizing, by the computing system, the partially optimized instance of the machine-learned 3D implicit representation model with the machine-learned multi-view image model to obtain a further optimized instance of the machine-learned 3D implicit representation model.

11. The computer-implemented method of claim 10, wherein performing the fractional training process with the plurality of training images further comprises:

performing, by the computing system, a fractional optimization process with the partially trained instance of the machine-learned generative image model to an instance of the machine-learned 3D implicit representation model obtain the partially optimized instance of the machine-learned 3D implicit representation model.

12. The computing system of claim 11, wherein performing the fractional optimization process with the partially trained instance of the machine-learned generative image model comprises performing the fractional optimization process with the partially trained instance of the machine-learned generative image model and a score distillation (SDS) loss function.

13. The computing system of claim 12, wherein performing the fractional optimization process with the partially trained instance of the machine-learned generative image model and the score distillation (SDS) loss function comprises, for one or more iterations:

processing a textual prompt with the partially trained instance of the machine-learned generative image model to obtain a plurality of images corresponding to the textual prompt;

processing the plurality of images and viewpoint information indicative of a viewpoint within a three-dimensional space with the partially optimized instance of the machine-learned 3D implicit representation model to obtain a rendering from the viewpoint within the three-dimensional space; and evaluating the rendering with the SDS loss function; and modifying values of one or more parameters of the partially optimized instance of the machine-learned 3D implicit representation model.

14. The computing system of claim 13, wherein optimizing the partially optimized instance of the machine-learned 3D implicit representation model comprises:

processing a textual prompt with the machine-learned multi-view image model to obtain a plurality of multi-view images corresponding to the textual prompt;

processing the plurality of multi-view images and second viewpoint information indicative of a second viewpoint with the partially optimized instance of the machine-learned 3D implicit representation model to obtain a second rendering from the second viewpoint within the three-dimensional space; and evaluating the second rendering with the SDS loss function; and modifying values of one or more parameters of the partially optimized instance of the machine-learned 3D implicit representation model based on the SDS loss function to obtain the further optimized instance of the machine-learned 3D implicit representation model.

15. The computing system of claim 14, wherein optimizing the partially optimized instance of the machine-learned 3D implicit representation model further comprises:

evaluating a reconstruction loss function that evaluates a difference between the second rendering and the plurality of multi-view images; and modifying values of one or more parameters of the further optimized instance of the machine-learned 3D implicit representation model based on the reconstruction loss function.

16. The computing system of claim 10, wherein performing the fractional training process with a plurality of training images to an instance of a machine-learned generative image model comprises performing N training iterations with the plurality of training images to the instance of the machine-learned generative image model; and wherein the fully trained instance of the machine-learned generative image model is trained using a training process with M training iterations, and wherein M>N.

17. The computing system of claim 10, wherein the machine-learned generative image model comprises a Neural Radiance Field (NeRF) model.

18. The computing system of claim 10, wherein generating the plurality of pseudo multi-view subject images comprises:

rendering, by the computing system a plurality of multi-view images at a respective plurality of random viewpoints based on the plurality of training images; and processing the plurality of multi-view images with the fully trained instance of the machine-learned generative image model to obtain the plurality of pseudo multi-view subject images.

19. The computing system of claim 10, wherein the machine-learned 3D implicit representation model comprises one or more multi-layer perceptrons (MLPs).

20. One or more non-transitory computer-readable media that store instructions that, when executed by one or more processors, cause the one or more processors to perform operations, the operations comprising:

performing a fractional optimization process with a partially trained instance of a machine-learned generative image model to an instance of a machine-learned three-dimensional (3D) implicit representation model to obtain a partially optimized instance of the machine-learned 3D implicit representation model, wherein the machine-learned 3D implicit representation model is trained to generate novel representations of a scene depicted by a set of images, wherein the machine-learned generative image model is partially trained to generate images from a textual prompt;

based on a plurality of training images, generating a plurality of pseudo multi-view subject images with the partially optimized instance of the machine-learned 3D implicit representation model and a fully trained instance of the machine-learned generative image model;

training the partially trained instance of the machine-learned generative image model with a set of training data comprising the plurality of training images and the plurality of pseudo multi-view subject images to obtain a machine-learned multi-view image model; and optimizing the partially optimized instance of the machine-learned 3D implicit representation model with the machine-learned multi-view image model to obtain a further optimized instance of the machine-learned 3D implicit representation model.

21. The one or more non-transitory computer-readable media of claim 20, wherein, prior to performing the fractional optimization process with the partially trained instance of the machine-learned generative image model, the operations comprise:

performing a fractional training process with the plurality of training images to an instance of the machine-learned generative image model to obtain the partially trained instance of the machine-learned generative image model.

\* \* \* \* \*